United States Patent
Machida

(10) Patent No.: US 8,984,123 B2
(45) Date of Patent: *Mar. 17, 2015

(54) REJUVENATION PROCESSING DEVICE, REJUVENATION PROCESSING SYSTEM, COMPUTER PROGRAM, AND DATA PROCESSING METHOD

(75) Inventor: Fumio Machida, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/262,146

(22) PCT Filed: Mar. 15, 2010

(86) PCT No.: PCT/JP2010/001828
§ 371 (c)(1),
(2), (4) Date: Sep. 29, 2011

(87) PCT Pub. No.: WO2010/122709
PCT Pub. Date: Oct. 28, 2010

(65) Prior Publication Data
US 2012/0030335 A1 Feb. 2, 2012

(30) Foreign Application Priority Data
Apr. 23, 2009 (JP) .................. 2009-104692

(51) Int. Cl.
*G06F 15/173* (2006.01)
*G06F 11/20* (2006.01)
(Continued)

(52) U.S. Cl.
CPC ........ *G06F 11/2028* (2013.01); *G06F 11/1438* (2013.01); *G06F 9/45558* (2013.01);
(Continued)

(58) Field of Classification Search
CPC .................. G06F 11/2046; G06F 2009/4557; G06F 2201/815; G06F 9/455
USPC .................. 709/223, 224, 226, 227, 228, 229
See application file for complete search history.

(56) References Cited

U.S. PATENT DOCUMENTS 6,594,784 B1 * 7/2003 Harper et al. ................. 714/47.2
7,100,079 B2 * 8/2006 Gross et al. .................... 714/23
(Continued)

FOREIGN PATENT DOCUMENTS

JP 04-024732 A 1/1992
JP 07-078037 A 3/1995
(Continued)

OTHER PUBLICATIONS

Kourai, Kenichi, et al., "A Fast Rejuvenation Technique for Server Consolidation with Virtual Machines", 37th Annual IEEE/IFIP International Conference on Dependable Systems and Networks (DSN'07) © 2007.

(Continued)

Primary Examiner — Dhairya A Patel
(74) Attorney, Agent, or Firm — Foley & Lardner LLP

(57) ABSTRACT

At least one host machine (3) is selected as an object to be rejuvenated from among each of the host machines (3). A virtual machine (302) operating in the host machine (3) selected as the object to be rejuvenated is migrated to a standby server (4). The migrated virtual machine (302) is operated in the standby server (4), and the standby server (4) is caused to function as the host machine (3). The host machine (3) selected as the object to be rejuvenated is rejuvenated. The rejuvenated host machine (3) is caused to stand by as the standby server (4). Thereby, it is possible to provide a rejuvenation processing device capable of rejuvenating the host machine while continuously operating the virtual machine.

9 Claims, 10 Drawing Sheets

(51) Int. Cl.
*G06F 11/14* (2006.01)
*G06F 9/455* (2006.01)
*G06F 9/48* (2006.01)

(52) U.S. Cl.
CPC .............. *G06F9/455* (2013.01); *G06F 9/4856* (2013.01); *G06F 11/2046* (2013.01); *G06F 2009/4557* (2013.01); *G06F 2201/815* (2013.01)
USPC .......................... 709/224; 709/216; 709/223

(56) References Cited

U.S. PATENT DOCUMENTS

| | | | |
|---|---|---|---|
| 8,112,527 B2 | 2/2012 | Kawato | |
| 8,171,349 B2* | 5/2012 | Stern et al. | 714/47.1 |
| 8,327,354 B1* | 12/2012 | Magenheimer et al. | 718/1 |
| 2002/0087913 A1* | 7/2002 | Harper et al. | 714/15 |
| 2003/0079154 A1* | 4/2003 | Park et al. | 714/1 |
| 2004/0003319 A1 | 1/2004 | Ukai et al. | |
| 2005/0251802 A1 | 11/2005 | Bozek et al. | |
| 2006/0130044 A1 | 6/2006 | Avritzer et al. | |
| 2006/0155912 A1* | 7/2006 | Singh et al. | 711/6 |
| 2007/0083794 A1* | 4/2007 | Yu | 714/38 |
| 2007/0220121 A1 | 9/2007 | Suwarna | |
| 2008/0163004 A1 | 7/2008 | Yu | |
| 2009/0044265 A1* | 2/2009 | Ghosh et al. | 726/14 |
| 2010/0070725 A1* | 3/2010 | Prahlad et al. | 711/162 |
| 2010/0094948 A1* | 4/2010 | Ganesh et al. | 709/212 |
| 2012/0023495 A1 | 1/2012 | Machida | |

FOREIGN PATENT DOCUMENTS

| | | |
|---|---|---|
| JP | 8-95814 A | 4/1996 |
| JP | 09-305218 A | 11/1997 |
| JP | 2000-222376 A | 8/2000 |
| JP | 2001-188684 A | 7/2001 |
| JP | 2004-30363 A | 1/2004 |
| JP | 2007-536657 A | 12/2007 |
| JP | 2008-217302 A | 9/2008 |
| JP | 2008-299791 A | 12/2008 |
| JP | 2009-80704 A | 4/2009 |
| WO | WO-2007/136021 A1 | 11/2007 |

OTHER PUBLICATIONS

Office Action dated May 22, 2013 issued in U.S. Appl. No. 13/260,659, filed Sep. 27, 2011.

Fumio Machida et al., Toward Optimal Virtual Machine Placement and Rejuvenation Scheduling in a Virtualized Data Center, IEEE, 2008, 3 pages.

Luis Moura Silva et al., Using Virtualization to Improve Software Rejuvenation, Sixth IEEE International Symposium on Network Computing and Applications (NCA 2007), 2007, 10 pages.

Thandar Thein et al., Availability Modeling and Analysis on Virtualized Clustering with Rejuvenation, IJCSNS International Journal of Computer Science and Network Security, vol. 8, No. 9, Sep. 2008, pp. 72-80.

USPTO Office Action, U.S. Appl. No. 13/260,659, Dec. 4, 2013, 23 pages.

Notice of Allowance mailed Mar. 27, 2014 in related U.S. Appl. No. 13/260,659 (10 pgs.).

* cited by examiner

FIG. 3

| HOST MACHINE | VIRTUAL MACHINE | AGING CHARACTERISTICS |
|---|---|---|
| host01 | vm01 | A |
| host01 | vm02 | B |
| host01 | vm03 | C |
| host02 | vm04 | A |
| host02 | vm05 | B |
| host02 | vm06 | D |
| host03 | | |

COLD STANDBY

REJUVENATION PROCESSING DEVICE, REJUVENATION PROCESSING SYSTEM, COMPUTER PROGRAM, AND DATA PROCESSING METHOD

This application is the National Phase of PCT/JP2010/001828, filed Mar. 15, 2010, which claims priority to Japanese Application No. 2009-104692, filed Apr. 23, 2009, the disclosures of which are hereby incorporated by reference in their entirety.

TECHNICAL FIELD

The present invention relates to a rejuvenation processing device that integrally controls a plurality of host machines, and particularly relates to a rejuvenation processing device that integrally controls a plurality of host machines composed of hardware in which at least one virtual machine operates by software, a rejuvenation processing system having the rejuvenation processing device, a computer program of the rejuvenation processing device, and a data processing method.

BACKGROUND ART

When online applications and the like which continue to provide long-term services are hosted in a data center, reliability or availability of the data center is important. In the related art, as methods of making a system highly reliable, although a redundancy or clustering technique, a fault recovery method and the like are used, a reliability management method adapted to a configuration of a complicated data center is required.

Particularly, in recent years, in a data center server integration has increasingly been performed by a server virtualization function, and thus the reliability management of a virtual machine or virtualization software has become a new challenge. The virtualization software is software for creating a plurality of virtual machines on a host machine to operate them, and requires high reliability for stably operating the virtual machines.

As a problem specific to software continuously operating for a long period of time such as a virtual machine or virtualization software, there is a degradation phenomenon of the operating environment due to an aging-related bug. The aging-related bug means a bug which causes performance degradation, failures or the like by the continuous operation for a long period of time.

There may be a case in which it is difficult to completely remove the aging-related bug at the time of debugging thereof, and particularly in software such as libraries which a third party develops, the existence of bugs can be confirmed but it is difficult to remove the bugs.

As an effective solution to the aging-related bug, software rejuvenation is known. Software rejuvenation is a method to prevent or postpone failures caused by aging-related bugs by resetting the internal state or the operating environment of the aged software. Since downtime occurs in rejuvenation processing itself in the software rejuvenation, it is necessary to schedule the rejuvenation at an appropriate timing or interval. Consequently, there is a method of preventing failures by periodically executing the rejuvenation processing on the basis of the operating time of software (see, for example, Patent Document 1). In addition, there is also a method of normalizing an operation by monitoring the application operation and restarting a process (see, for example, Patent Document 2).

RELATED DOCUMENT

Patent Document

[Patent Document 1] Japanese Unexamined Patent Publication No. 2001-188684
[Patent Document 2] Japanese Unexamined Patent Publication No. 08-095814

DISCLOSURE OF THE INVENTION

However, when the rejuvenation method in the related art is applied to the virtualization software as it is, there is a problem that the virtual machine has to be stopped unnecessarily due to the rejuvenation of the virtualization software (rejuvenation of the host machine).

Since the virtual machine runs on the virtualization software (on the host machine), it is necessary to stop all the virtual machines at the time of the stop of the virtualization software. The unnecessary stop of the virtual machine leads to an increase in the downtime of the entire application system, and thus it is not desirable from the viewpoint of an improvement in the availability.

As another problem, there may be a case in which the rejuvenation method in the related art cannot be applied to the virtualization software as it is. The reason is because the virtual machine or the application operating on the virtual machine is dependent on the virtualization software, and it is also necessary to consider the state of the virtual machine or the application at the time of the rejuvenation of the virtualization software.

As still another problem, there may be a case in which the downtime of the virtual machine is increased unnecessarily due to the rejuvenation of the virtualization software. The reason is because appropriate timing of the rejuvenation is present respectively in the virtual machine and the application operating the virtual machine, and does not necessarily coincide with the timing of the rejuvenation of the virtualization software.

As still another problem, there may be a case in which costs are involved for high reliability by duplexing or multiplexing. The reason is because even when a duplexing or multiplexing configuration is taken by the virtual machine, a computer resource for operating the virtual machine is required, and costs rise due to an increase in the number of host machines, or increases in power consumption, cooling costs, and management and maintenance costs.

The invention is contrived in view of the problems as described above, and an object thereof is to provide a rejuvenation processing device capable of rejuvenating the host machine without being associated with the stop of the virtual machine, a rejuvenation processing system having the rejuvenation processing device, a computer program of the rejuvenation processing device, and a data processing method.

A rejuvenation processing device according to the invention is a device that controls a plurality of host machines in which a virtual machine operates and at least one standby server in which the virtual machine does not operate, including: rejuvenation scheduling unit that selects at least one of the host machines as an object to be rejuvenated from among each of the host machines; virtual machine migration unit that migrates the virtual machine, operating in the host machine selected as the object to be rejuvenated, to the standby server; server migration unit that operates the migrated virtual machine in the standby server and causes the standby server to function as the host machine; host rejuvenation unit that rejuvenates the host machine selected as the object to be rejuvenated; and standby preparation unit that causes the rejuvenated host machine to stand by as a standby server.

A rejuvenation processing system according to the invention includes: a plurality of host machines in which a virtual machine operates; at least one standby server in which the virtual machine does not operate; rejuvenation scheduling unit that selects at least one of the host machines as an object to be rejuvenated from among each of the host machines; virtual machine migration unit that migrates the virtual machine, operating in the host machine selected as the object to be rejuvenated, to the standby server; server migration unit that operates the migrated virtual machine in the standby server and causes the standby server to function as the host machine; host rejuvenation unit that rejuvenates the host machine selected as the object to be rejuvenated; and standby preparation unit that causes the rejuvenated host machine to stand by as the standby server.

A computer program according to the invention is a program of a rejuvenation processing device that controls a plurality of host machines in which a virtual machine operates and at least one standby server in which the virtual machine does not operate, the program causing the rejuvenation processing device to execute: a rejuvenation scheduling process of selecting at least one of the host machines as an object to be rejuvenated from among each of the host machines; a virtual migration process of migrating the virtual machine, operating in the host machine selected as the object to be rejuvenated, to the standby server; a server migration process of operating the migrated virtual machine in the standby server and causing the standby server to function as the host machine; a host rejuvenation process of rejuvenating the host machine selected as the object to be rejuvenated; and a standby preparation process of causing the rejuvenated host machine to stand by as the standby server.

A data processing method according to the invention is a method of a rejuvenation processing device that controls a plurality of host machines in which a virtual machine operates and at least one standby server in which the virtual machine does not operate, the method causing the rejuvenation processing device to execute: a rejuvenation scheduling operation of selecting at least one of the host machines as an object to be rejuvenated from among each of the host machines; a virtual migration operation of migrating the virtual machine, operating in the host machine selected as the object to be rejuvenated, to the standby server; a server migration operation of operating the migrated virtual machine in the standby server and causing the standby server to function as the host machine; a host rejuvenation operation of rejuvenating the host machine selected as the object to be rejuvenated; and a standby preparation operation of causing the rejuvenated host machine to stand by as the standby server.

Meanwhile, various types of components of the invention may be formed so as to realize functions thereof, and can be realized as, for example, dedicated hardware exhibiting a predetermined function, a rejuvenation processing device to which a predetermined function is given by a computer program, a predetermined function realized in the rejuvenation processing device by the computer program, any combination thereof, and the like.

In addition, various types of components of the invention do not necessarily have to exist individually independently, and may be configured such that a plurality of components is formed as one member, one component is formed by a plurality of members, any component is a portion of other components, and a portion of any component and a portion of other components duplicate each other.

In addition, although a plurality of processes and operations is described in order in the computer program and the data processing method of the invention, the described order is not intended to limit the order of executing a plurality of processes and a plurality of operations.

For this reason, when the computer program and the data processing method according to the invention are carried out, it is possible to change the order of a plurality of processes and a plurality of operations thereof in the range without any trouble in terms of the contents.

Further, the computer program and the data processing method according to the invention are not limited to the execution at the timing where a plurality of processes and a plurality of operations are individually different. For this reason, other processes and operations may be generated during the execution of any process and operation, and a portion or all of the timing of executing any process and operation and the timing of executing other processes and operations may overlap each other.

In the rejuvenation processing device of the invention, at least one host machine is selected as an object to be rejuvenated from among each of the host machines. The virtual machine operating the host machine selected as the object to be rejuvenated is migrated to the standby server. The migrated virtual machine is operated in the standby server, and the standby server is caused to function as the host machine. The host machine selected as the object to be rejuvenated is rejuvenated. The rejuvenated host machine is caused to stand by as the standby server. For this reason, the virtual machine may be rejuvenated by an inherent schedule, and it is not necessary to stop the virtual machines all together which are operated at the time of rejuvenating the host machine. Therefore, it is possible to rejuvenate the host machine while continuously operating the virtual machines.

BRIEF DESCRIPTION OF THE DRAWINGS

The above-mentioned objects, other objects, features and advantages will be made clearer from the preferred embodiment described below, and the following accompanying drawings.

FIG. 3 is a characteristic diagram illustrating a relationship between a host machine and a virtual machine and aging characteristics.

DESCRIPTION OF EMBODIMENTS

Figure 1:
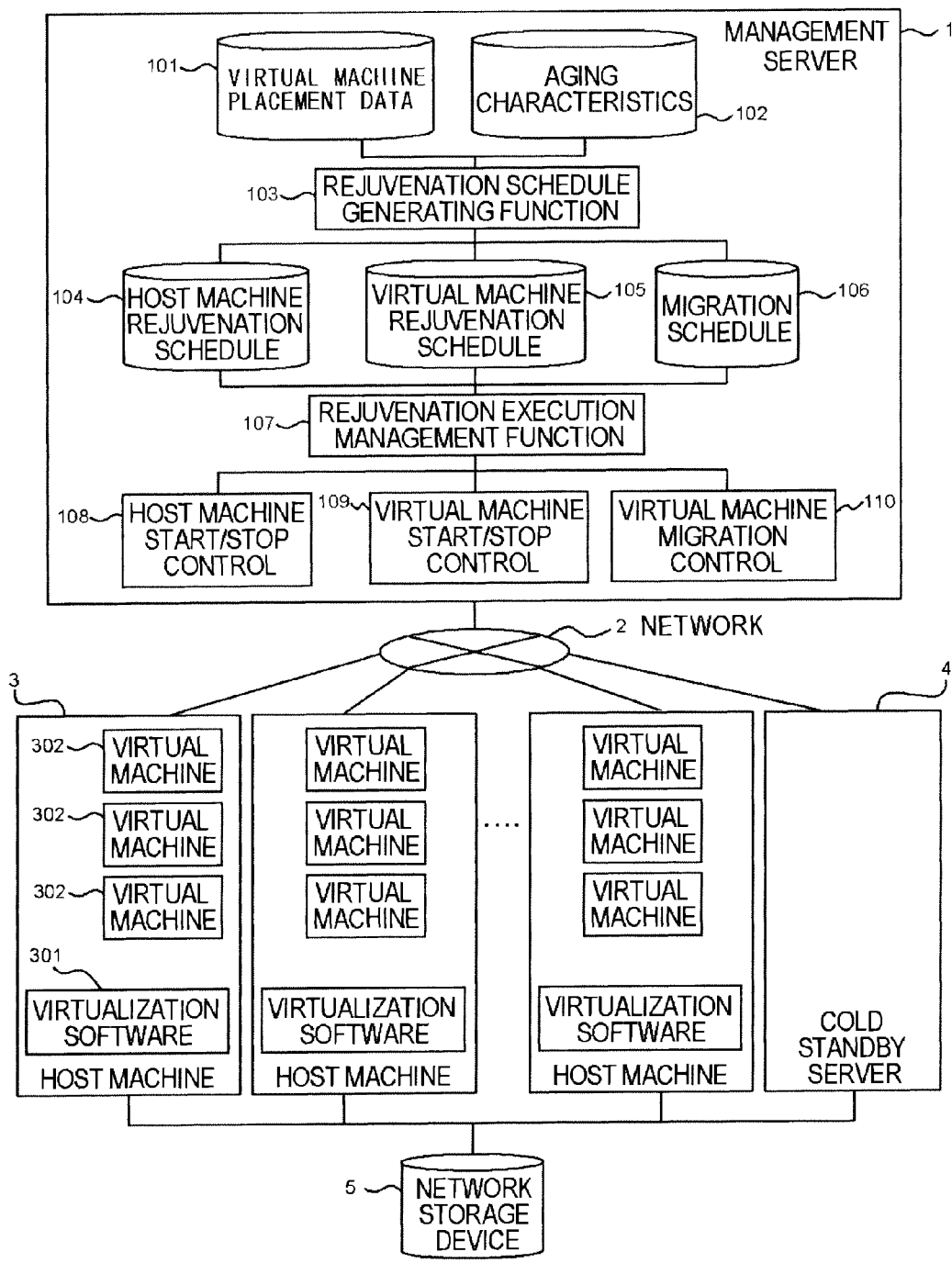
FIG. 1 is a schematic block diagram illustrating a logical structure of a rejuvenation processing system according to an embodiment of the invention.

An embodiment of the invention will be described below with reference to FIGS. 1 to 8. Referring to FIG. 1, a rejuvenation processing system according to the embodiment of the invention is constituted by a management server 1 which is a rejuvenation processing device operating by a program control, a communication network 2, a plurality of host machines 3, at least one cold standby server 4, and a network storage device 5.

The management server 1 is connected to a plurality of host machines 3 and the cold standby server 4 through the communication network 2. In addition, a plurality of host machines 3 and the cold standby server 4 share the network storage device 5.

A plurality of host machines 3 is composed of hardware in which at least one virtual machine 302 operates by virtualization software 301 which is software. The cold standby server 4 is composed of at least one of a plurality of host machines 3, and exceptionally the virtual machine 302 is not mounted therein. The management server 1 integrally controls a plurality of host machines 3 and one cold standby server 4 as described above.

Meanwhile, the management server 1 of the embodiment includes a host machine rejuvenation schedule 104 which is rejuvenation scheduling unit that selects at least one host machine 3 as an object to be rejuvenated from among each of the host machines 3, a virtual machine migration control function 110 which is virtual machine migration unit that migrates the virtual machine 302, operating in the host machine 3 selected as the object to be rejuvenated, to the cold standby server 4, a virtual machine start/stop control function 109 equivalent to server migration unit that operates the migrated virtual machine 302 in the cold standby server 4 and causes the cold standby server 4 to function as the host machine 3, a host machine start/stop control function 108 equivalent to host rejuvenation unit that rejuvenates the host machine 3 selected as the object to be rejuvenated, and a rejuvenation execution management function 107 equivalent to standby preparation unit that causes the rejuvenated host machine 3 to stand by as the cold standby server 4.

Meanwhile, the host machine rejuvenation schedule 104 selects the host machine 3 rejuvenated by individually determining each of the aging states. For this reason, the management server further includes aging characteristics 102 which are aging management unit in which the aging characteristics are registered beforehand for each of a plurality of host machines 3, and the host machine rejuvenation schedule 104 selects the host machine 3 rejuvenated in response to the aging characteristics.

However, in the aging characteristics 102, the aging characteristics are registered beforehand for each of the virtual machines 302 of a plurality of host machines 3, and the host machine rejuvenation schedule 104 selects the host machine 3 rejuvenated in response to the aging characteristics of the operating virtual machine 302.

In addition, the virtual machine migration control function 110 stops the virtual machine 302 to be migrated, and the virtual machine start/stop control function 109 restarts and rejuvenates the migrated virtual machine 302.

The cold standby server 4 does not operate at the time of the standby, and the host machine rejuvenation schedule 104 starts the cold standby server 4 before the virtual machine 302 is migrated, and stops the cold standby server 4 which is rejuvenated and is standing by.

More specifically, the management server 1 includes a rejuvenation schedule generating function 103, a virtual machine placement data 101, a virtual machine rejuvenation schedule 105, and a migration schedule 106, in addition to each of the parts mentioned above.

A plurality of host machines 3 is connected in parallel to, for example, the communication network 2, and includes at least one virtualization software 301 and at least one or more virtual machines 302 therewith, respectively. Although described later in detail, the cold standby server 4 is composed of the host machine 3, and the host machine 3 in a specific state is referred to as the cold standby server 4.

These components operate roughly as follows. The rejuvenation schedule generating function 103 reads the virtual machine placement data 101 and the aging characteristics 102, generates a host machine rejuvenation schedule, a virtual machine rejuvenation schedule and a migration schedule, and stores them in the host machine rejuvenation schedule 104, a virtual machine rejuvenation schedule 105, and a migration schedule 106.

The rejuvenation execution management function 107 calls the host machine start/stop control function 108, the virtual machine start/stop control function 109, and the virtual machine migration control function 110 on the basis of generated schedule information, and operates the virtualization software 301 and the virtual machine 302.

The host machine start/stop control function 108 starts/stops virtualization software of the host machine 3 and the cold standby server 4 through the communication network 2. The start/stop of the virtualization software corresponds to the start/stop of the host machine.

The virtual machine start/stop control function 109 operates the start/stop of the virtual machine 302 through the communication network 2. All the images of the virtual machine 302 are stored in the network storage device 5, and can be referenced by all of the host machines 3 and the cold standby servers 4.

The virtual machine migration control function 110 operates the virtualization software 301 through the communication network 2, and migrates the virtual machine 302 to another host machine 3.

The virtual machine 302 temporarily enters a stopped state by the migration of the virtual machine 302, but the migration time can be reduced to much shorter than the restart time.

Meanwhile, a computer program of the management server 1 as mentioned above is described as to, for example, causing the management server 1 to execute a rejuvenation scheduling process of selecting at least one host machine 3 as an object to be rejuvenated from among each of the host machines 3, a virtual migration process of migrating the virtual machine 302, operating in the host machine 3 selected as the object to be rejuvenated, to the cold standby server 4, a server migration process of operating the migrated virtual machine 302 in the cold standby server 4 and causing the cold standby server 4 to function as the host machine 3, a host rejuvenation processing of rejuvenating the host machine 3 selected as the object to be rejuvenated, and a standby preparation process of causing the rejuvenated host machine 3 to stand by as the cold standby server 4.

Figure 2:
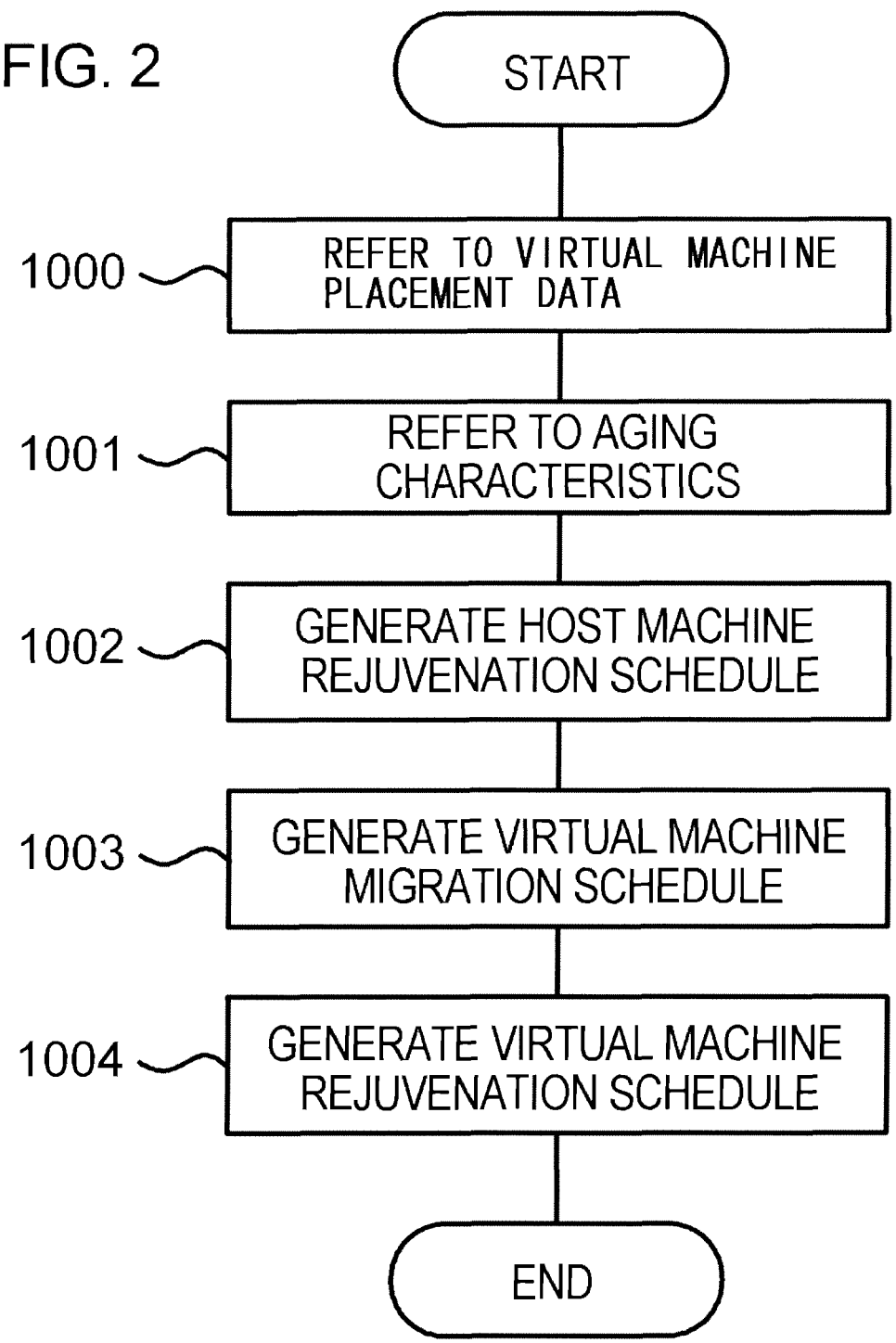
FIG. 2 is a flow diagram illustrating a processing operation of a rejuvenation schedule generating function.

Next, an operation of the rejuvenation schedule generating function 103 according to the embodiment will be described in detail with reference to a flow diagram of FIG. 2. The rejuvenation schedule generating function 103 refers to the virtual machine placement data 101, to assess the virtual machine 302 operating on each of the host machines 3 (step 1000).

Here, an example of the virtual machine placement data is shown in FIG. 3. In this example, there are three host machines 3, and host03 is in a cold standby state. The sum total of six virtual machines 302 operate on host01 and host02.

Each of the virtual machines 302 hosts an application, and the aging characteristics are different from each other depending on the application or OS (Operating System) used. In the example of FIG. 3, the aging characteristics are distinguished by A, B, C, and D.

Figure 4:
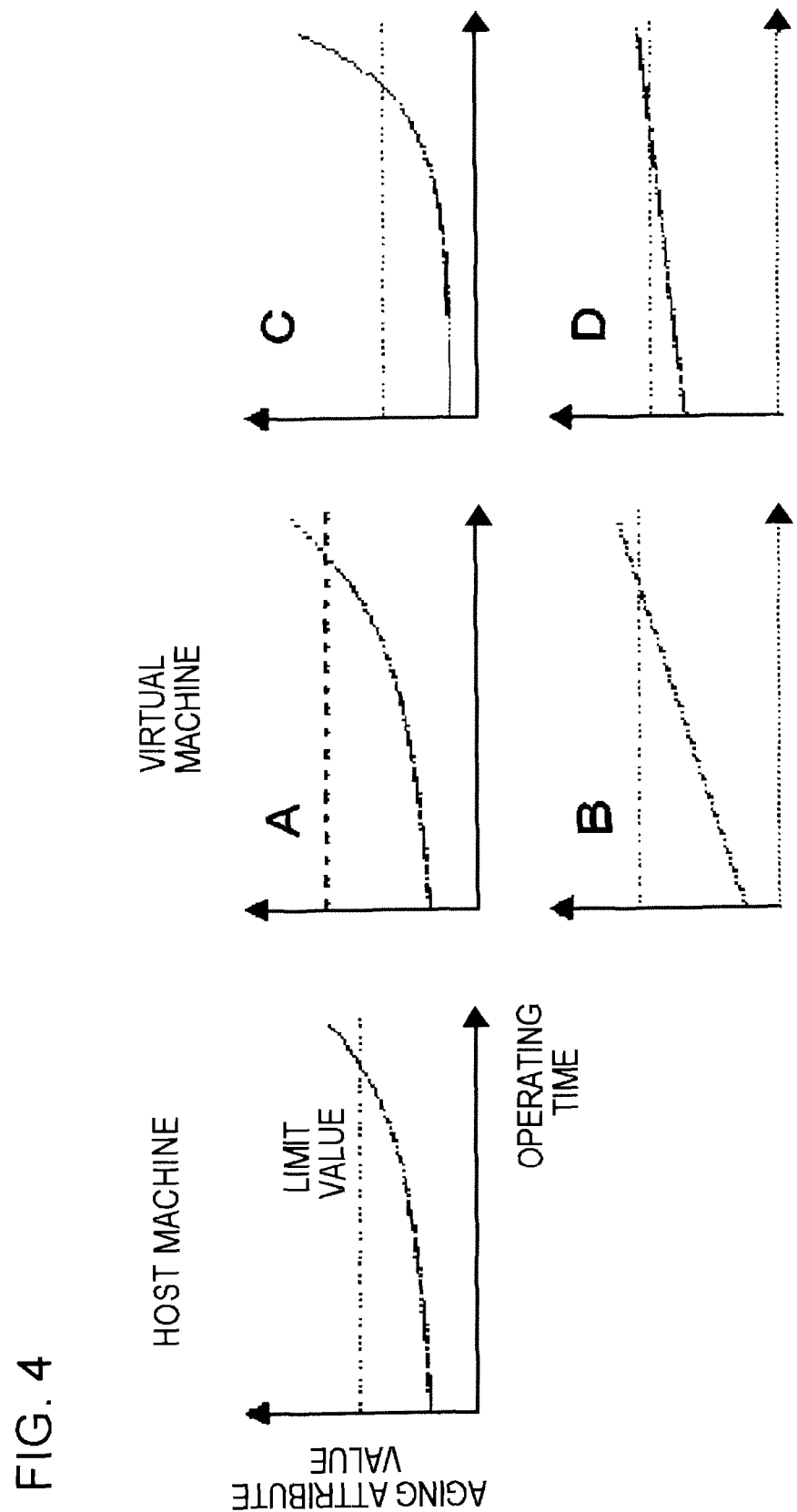
FIG. 4 is a characteristic diagram illustrating various types of aging characteristics.

Next, the rejuvenation schedule generating function 103 refers to the aging characteristics 102, to acquire specific information of each of the aging characteristics (step 1001). A specific example of the aging characteristics is shown in FIG. 4.

The aging characteristics are expressed by a function of the operating time and the aging attribute value, and the limit value of the aging attribute value. The aging attribute value is the memory usage, the disk usage, the response time and the like in the system metrics which gradually increases or decreases as the operating time becomes longer.

Since the limit value is a value indicating the allowable limit value with respect to the aging attribute value, it is given by user requirements or system limitations. The aging characteristics as shown in FIG. 4 are given, whereby it is possible to evaluate the allowable continuous operating time with respect to each of the host machines 3 or the virtual machines 302.

The rejuvenation schedule generating function 103 first generates a rejuvenation schedule of the host machine 3 on the basis of the aging characteristics of the host machine 3 (step 1002). The rejuvenation schedule gives the time for executing the software rejuvenation.

Since the allowable continuous operating time can be evaluated by the aging characteristics, it is determined to execute the software rejuvenation within this time. In addition, the different host machines 3 are scheduled so as to be rejuvenated at different times so that a plurality of host machines 3 is not simultaneously stopped.

Here, the host machine 3 stopped at the time of the rejuvenation process is not restarted, but serves as the cold standby server 4. The cold standby server 4 operates before another host machine 3 is stopped, and takes over a process of the stopped server (specifically, performs a migration process described later).

The host machine 3 is stopped at the stage where the takeover process is terminated, and serves as the new cold standby server 4. It is possible to rejuvenate the host machines 3 in order by switching around the cold standby servers 4 in order.

Figure 5:
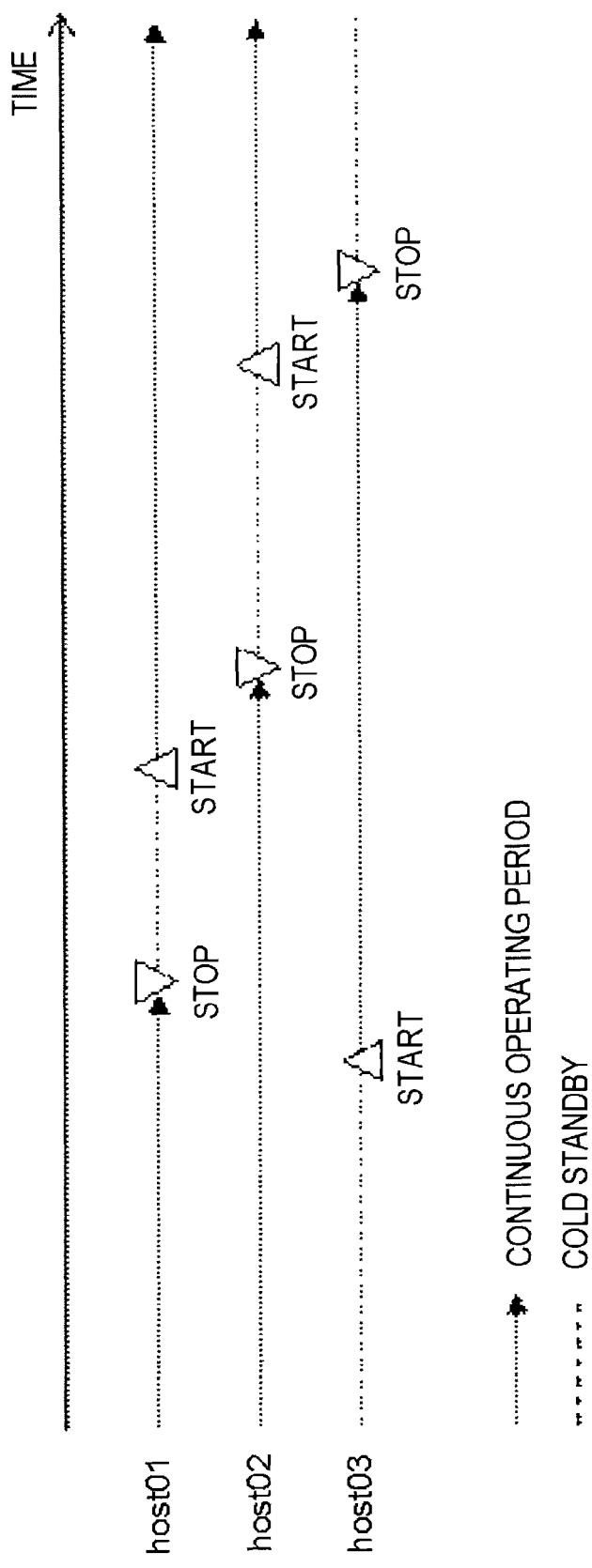
FIG. 5 is a time chart illustrating a rejuvenation schedule of the host machine.

An example of the rejuvenation schedule of the host machine 3 is shown in FIG. 5. Referring to FIG. 5, at least two of three host machines 3 are always in the operation state at any point in time, and all the host machines 3 are stopped and rejuvenated in order.

Next, a migration schedule of the virtual machine 302 is created on the basis of the rejuvenation schedule of the generated host machine 3 (step 1003). The migration is used for evacuate the virtual machine 302 operating on the host machine 3 onto another host machine 3 before the host machine 3 is stopped.

The operated cold standby server 4 is used in an evacuation destination. The migration schedule of each of the virtual machines 302 is set after the start of the cold standby server 4 just before the host machine 3 hosting the virtual machine 302 is stopped.

Figure 6:
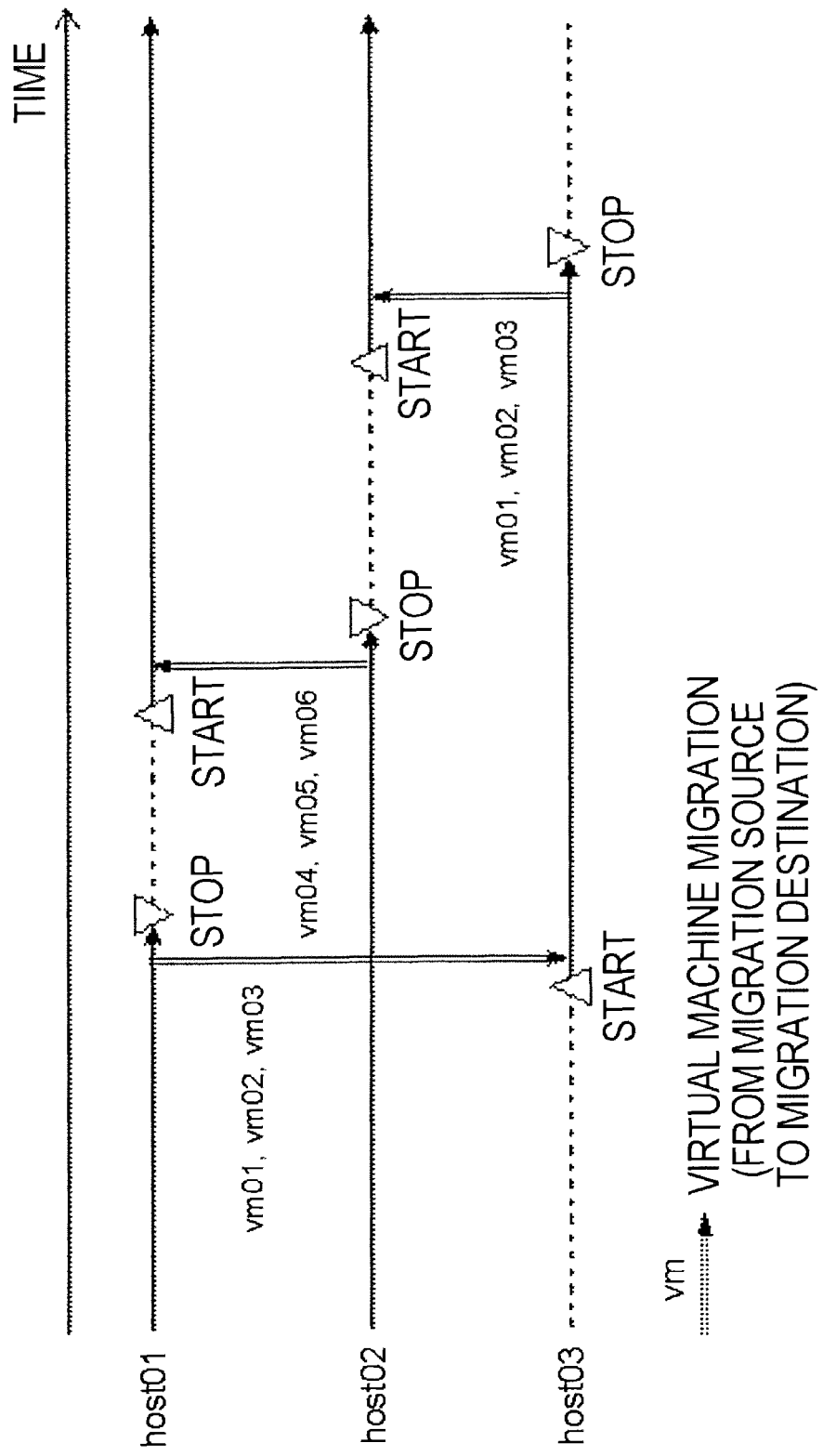
FIG. 6 is a time chart illustrating a migration schedule of the virtual machine.

An example of the migration schedule of the virtual machine 302 is shown in FIG. 6. In FIG. 6, operations are shown in which vm01, vm02, and vm03 operating on host01 are all migrated to host03 before host01 is stopped, vm04, vm05, and vm06 are migrated to host01 before host02 is stopped, and vm01, vm02, and vm03 are migrated to host02 before host03 is stopped.

Such a migration schedule is executed, whereby it is possible to continuously operate the virtual machines 302 without being dependent on the timing of the host stop. Finally, the rejuvenation schedule generating function generates a rejuvenation schedule of the virtual machine 302 on the basis of the aging characteristics of each of the virtual machines 302 (step 1004).

Since the virtual machine 302 is not influenced by the rejuvenation process of the host machine 3, it is possible to generate a schedule on the basis of the characteristics or performance requirements of the application by the rejuvenation schedule technique in the related art.

Figure 7:
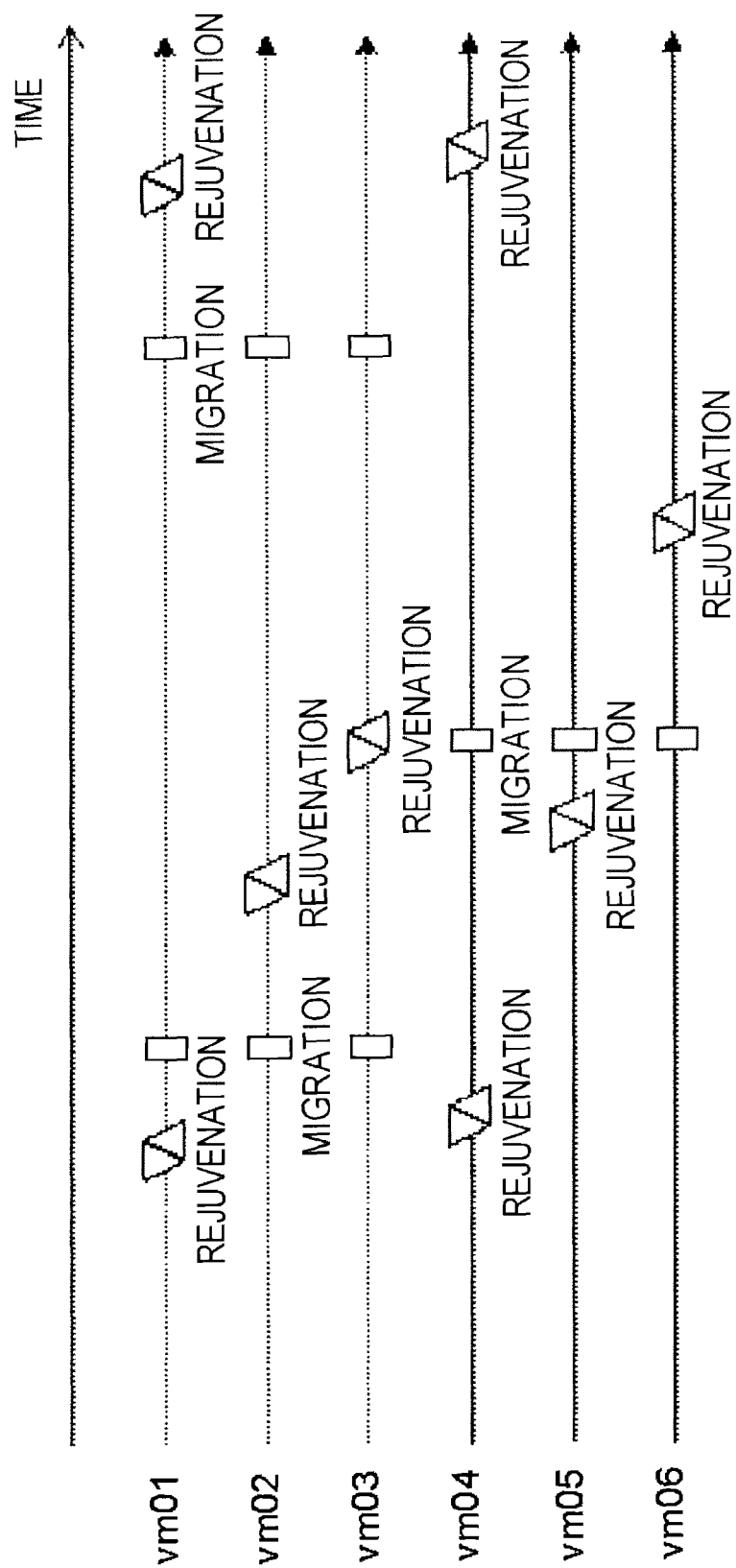
FIG. 7 is a time chart illustrating a rejuvenation schedule of the virtual machine.

An example of the rejuvenation schedule of the virtual machine 302 is shown in FIG. 7. When the dependency relationship of a cluster configuration and the like does not exist in the applications, it is possible to create a schedule independently of the individual virtual machines 302.

Although the example of the schedule in which the migration and the rejuvenation process do not overlap each other is shown in FIG. 7, it is also possible to take a method of stopping the virtual machine at the time of the migration and restarting it on another host machine 3.

Figure 8:
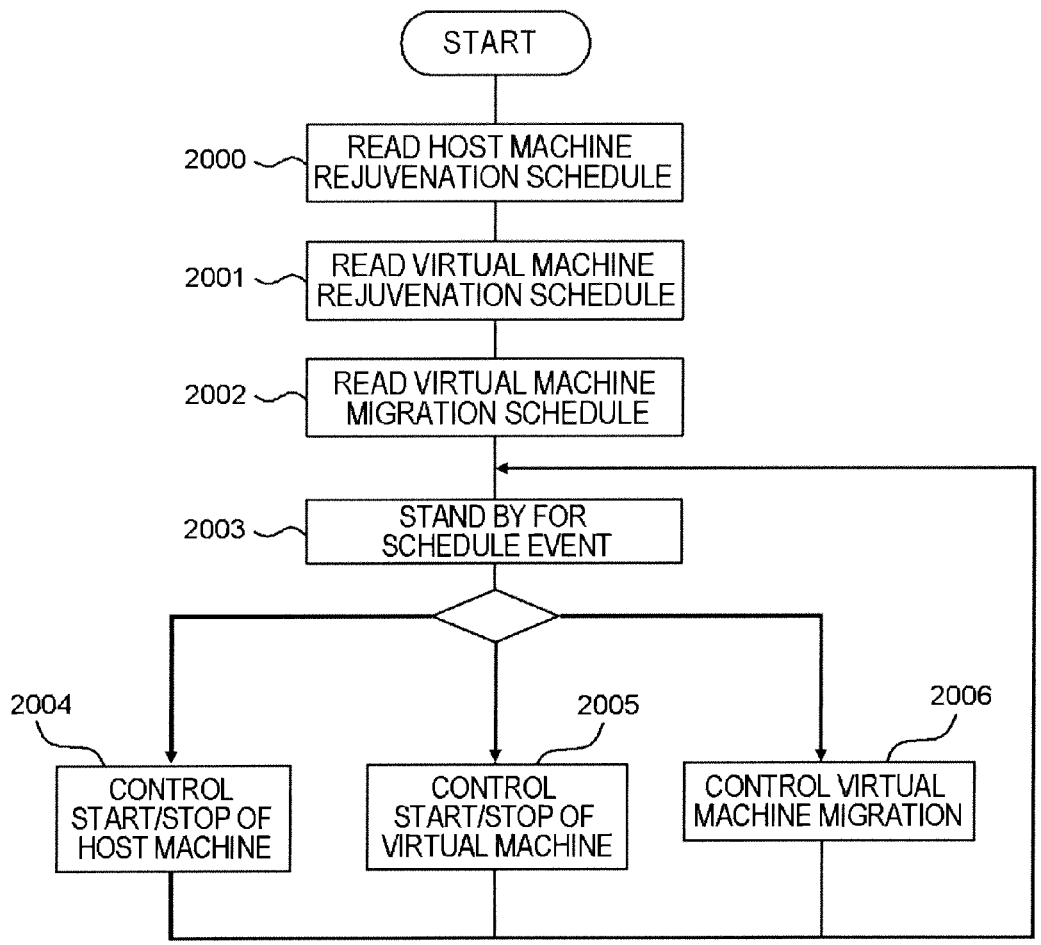
FIG. 8 is a flow diagram illustrating a processing operation of a rejuvenation execution management function.

Next, an operation of the rejuvenation execution management function 107 according to the embodiment will be described in detail with reference to a flow diagram of FIG. 8. The rejuvenation execution management function 107 reads the host machine rejuvenation schedule 104, the virtual machine rejuvenation schedule 105, and the migration schedule 106 which are generated by the rejuvenation schedule generating function (steps 2000 to 2002 of FIG. 8).

A standby operation is performed until an event in which the time is specified is generated by the schedule in this state (step 2003). When the generated event is a start/stop request of the host machine 3, the start/stop request is sent to the host machine start/stop control function 108 by specifying the host machine 3 as an object (step 2004).

The host machine start/stop control function 108 operates the start state of the host machine 3 through the network. The rejuvenation execution management function 107 enters the standby state again, and stands by for the generation of the scheduled event (step 2003).

Similarly, when the generated event is a start/stop request of the virtual machine 302, the start/stop request is sent to the virtual machine start/stop control function 109 by specifying the virtual machine 302 as an object (step 2005).

The virtual machine start/stop control function 109 operates the start state of the virtual machine 302 through the network. On the other hand, when the generated event is a migration request of the virtual machine 302, the migration request is sent to the virtual machine migration control function 110 by specifying a migration destination as the object virtual machine 302 (step 2006). The rejuvenation execution management function 107 is in a schedule event standby state, and calls a control function in accordance with the contents of the event when the event is generated.

Next, an effect of the embodiment will be described. In the management server 1 of the embodiment, at least one rejuvenated from a plurality of host machines 3 is selected. The virtual machine 302 operating in the selected host machine 3 is migrated to the cold standby server 4.

The cold standby server 4 is caused to function as the host machine 3 by operating the migrated virtual machine 302. The host machine 3 in which the virtual machine 302 is migrated is rejuvenated by selection.

The rejuvenated host machine 3 is caused to stand by as the cold standby server 4. For this reason, the virtual machine 302 may be rejuvenated by an inherent schedule, and it is not necessary to stop all the virtual machines 302 which are operated at the time of rejuvenating the host machine 3 together. Therefore, it is possible to rejuvenate the host machine 3 while continuously operating the virtual machines 302.

That is, the rejuvenation processing system of the embodiment is configured to generate a schedule for evacuating the virtual machine 302 to another host by migration before the host machine 3 is stopped, it is not necessary to stop the virtual machine 302 at the time of the rejuvenation process of the host machine 3.

In addition, since the embodiment is further configured to use the cold standby server 4, to start the cold standby server 4 only when the migration is needed and replace the rejuvenated host machine 3 with the new cold standby server 4, it is possible to improve the reliability of the entire system with less resource and less cost.

Moreover, the host machine rejuvenation schedule 104 selects the host machine 3 rejuvenated by individually determining each of the aging states. Particularly, as shown in FIGS. 3 and 4, the management server includes the aging characteristics 102 in which the aging characteristics are registered beforehand for each of a plurality of host machines 3, and the host machine rejuvenation schedule 104 selects the host machine 3 rejuvenated in response to the aging characteristics as shown in FIG. 5. For this reason, it is possible to execute the rejuvenation of a plurality of host machines 3 in the proper order.

In addition, as described above, the virtual machine migration control function 110 stops the virtual machine 302 to be migrated, and the virtual machine start/stop control function 109 may restart and rejuvenate the migrated virtual machine 302. In this case, it is also possible to efficiently rejuvenate the virtual machine 302 at the time of rejuvenating the host machine 3.

Further, since the cold standby server 4 does not operate during the time of standby period, it is possible to save power in the entire system. On the other hand, since the host machine rejuvenation schedule 104 starts the cold standby server 4 before the virtual machine 302 is migrated and stops the cold standby server 4 which is rejuvenated and is standing by, it is possible to efficiently operate the cold standby server 4.

Meanwhile, the invention is not limited to the above-mentioned embodiment, but permits various types of modifications to be made without departing from the gist. For example, in the above-mentioned embodiment, it is exemplified that the management server includes the aging characteristics 102 in which the aging characteristics are registered beforehand for each of a plurality of host machines 3, and the host machine rejuvenation schedule 104 selects the host machine 3 rejuvenated in response to the aging characteristics as shown in FIG. 5.

However, the management server includes the aging characteristics 102 that detects and records the aging state in real time for each of a plurality of host machines 3, and the host machine rejuvenation schedule 104 may select the host machine 3 rejuvenated in response to the recorded aging state.

Figure 9:
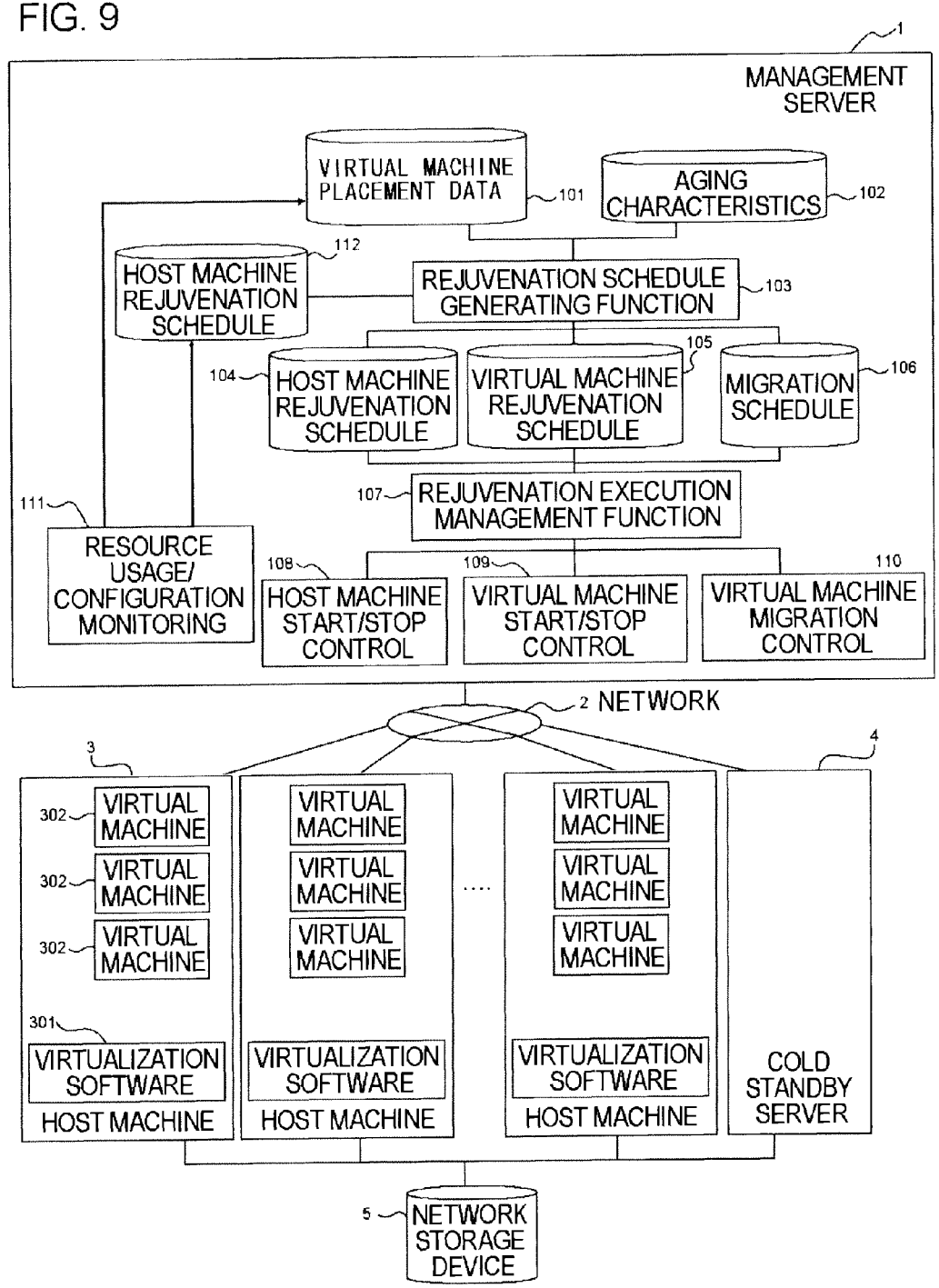
FIG. 9 is a schematic block diagram illustrating a logical structure of a rejuvenation processing system according to a modified example.

More specifically, referring to FIG. 9, the management server 1 further includes an aging state 112 and a resource usage/configuration monitoring function 111 as a component, in addition to the configuration of the management server of FIG. 1.

Next, a processing operation of the entire rejuvenation processing system according to a modified example will be described in detail with reference to a flow diagram of FIG. 10. In the rejuvenation processing system, the configuration and the aging state of the virtual machine 302 or the host machine 3 are continuously monitored, and the rejuvenation schedule is dynamically changed on the basis of the monitoring result.

First, the rejuvenation schedule generating function generates the host machine rejuvenation schedule 104, the virtual machine rejuvenation schedule 105, and the migration schedule 106, according to the rejuvenation schedule generating method described above.

Figure 10:
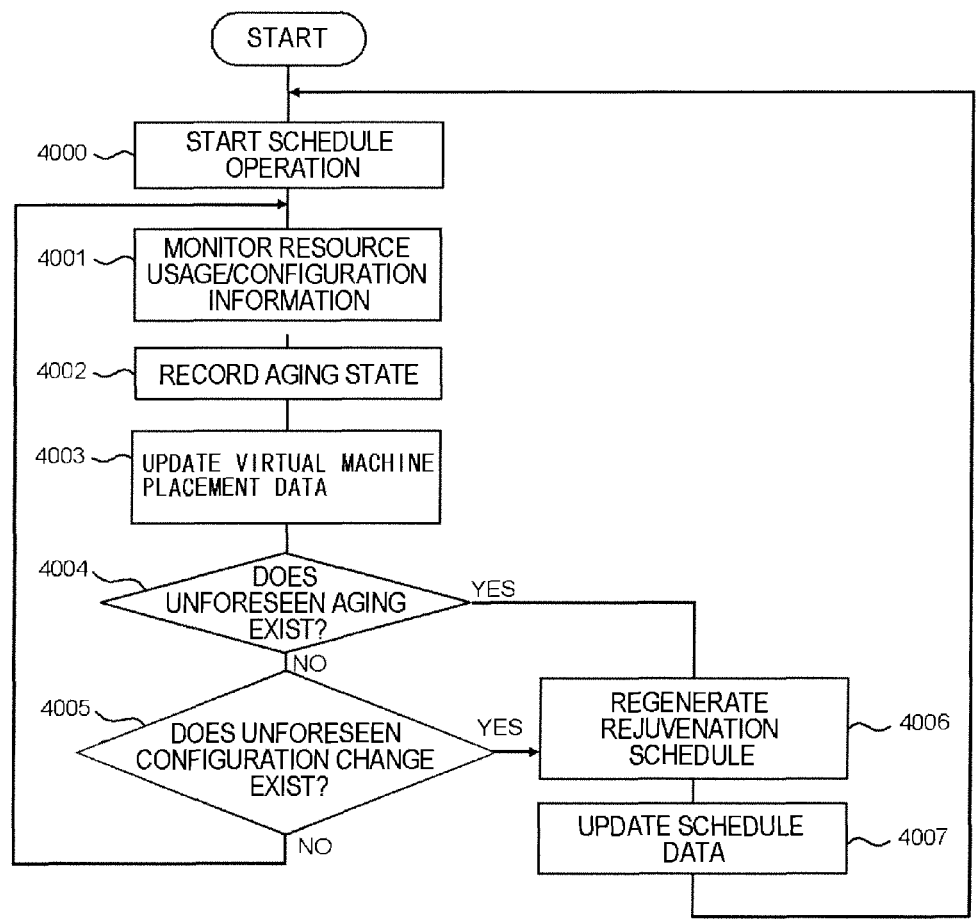
FIG. 10 is a flow diagram illustrating a processing operation of the entire rejuvenation processing system.

An operation is initiated on the basis of the generated schedule, and simultaneously, the resource usage and configuration information are monitored using the resource usage/configuration monitoring function (steps 4000 and 4001 of FIG. 10).

As a result of monitoring, data which possibly can be aged by data such as the resource usage are recorded in the aging state 112 (step 4002). When it is obvious that a change occurs in the arrangement of the virtual machine 302 through monitoring, the virtual machine placement data 101 is updated (step 4003).

Here, unlike an aging progress state assumed at the time of the creation of the schedule, when an unforeseen aging state is found, the rejuvenation schedule is regenerated so as to rejuvenate a component in which aging progresses in a little while (steps 4004 and 4006).

For example, when the online application such as the Web Server is an application in which the aging progresses depending on the number of received requests, there may be a case in which the aging accelerates by the request concentration even in a short time.

Such a state is detected to thereby serve as a trigger of the rejuvenation schedule regeneration. In addition, even when an unforeseen configuration change other than the migration and the like previously scheduled is detected, the rejuvenation schedule is regenerated as well (steps 4005 and 4006).

For example, when the new virtual machine 302 or the host machine 3 is additionally operated, or when the arrangement configuration of the virtual machine 302 is changed by the migration for the purpose of a load balance and the like, the regeneration of the rejuvenation schedule is performed.

The rejuvenation schedule obtained by the regeneration is stored in the host machine rejuvenation schedule 104, the virtual machine rejuvenation schedule 105, and the migration schedule 106, respectively (step 4007), and the schedule operation is continued by the rejuvenation execution management function 107. When rescheduling is not needed, monitoring is continued.

Since such a rejuvenation processing system is configured to detect the unexpected aging progress state by monitoring the resource usage, and regenerate the rejuvenation schedule, it is also possible to dynamically respond to the situation in which the aging progresses due to a factor other than the elapsed time.

Further, since the system is configured to detect the change of the unexpected arrangement configuration of the virtual machine by monitoring configuration information, and regenerate the rejuvenation schedule, it is possible to respond by dynamically changing the rejuvenation schedule in the environment where a function operates such as the automatic change of position of the virtual machine 302 for the purpose of the addition or the load balance of the host machine 3 or the virtual machine 302 by a system manager.

Meanwhile, the embodiment and a plurality of modified examples mentioned above can be naturally combined in the range consistent with the contents thereof. In addition, in the embodiment and modified examples mentioned above, although the structure and the like of each part have been specifically described, it is possible to variously change the structure and the like in the range that satisfies the invention.

The invention claimed is:

1. A rejuvenation processing device that controls a plurality of host machines in which a virtual machine operates and at least one standby server in which the virtual machine does not operate, comprising:
   a processor;
   an acquisition unit, executed by the processor, that acquires a rejuvenation schedule of the host machines, a rejuvenation schedule of the virtual machine, and a migration schedule of the virtual machine;
   a rejuvenation scheduling unit, executed by the processor, that selects at least one of the host machines as an object to be rejuvenated from among each of the host machines on the basis of the rejuvenation schedule of the host machines;
   a virtual machine migration unit, executed by the processor, that migrates the virtual machine, operating in the host machine selected as the object to be rejuvenated, to the standby server on the basis of the migration schedule of the host machines and the rejuvenation schedule of the virtual machine;
   a server migration unit, executed by the processor, that operates the migrated virtual machine in the standby server and causes the standby server to function as the host machine;
   a host rejuvenation unit, executed by the processor, that rejuvenates the host machine selected as the object to be rejuvenated;
   a standby preparation unit, executed by the processor, that causes the rejuvenated host machine to stand by as the standby server; and
   an aging management unit, executed by the processor, in which aging characteristics are registered beforehand for each of the plurality of host machines,
   wherein the virtual machine migration unit migrates the virtual machine to the standby server after stopping the virtual machine when there is an overlap in schedule between the migration of the virtual machine operating in the host machine selected as the object to be rejuvenated and the rejuvenation processing of the virtual machine,
   wherein the virtual machine migration unit migrates the virtual machine to the standby server without stopping the virtual machine when there is no overlap in schedule between the migration of the virtual machine operating in the host machine selected as the object to be rejuvenated and the rejuvenation processing of the virtual machine,
   wherein the rejuvenation scheduling unit selects the host machine which is rejuvenated by individually determining each of the aging states, and
   wherein the rejuvenation scheduling unit selects the host machine which is rejuvenated in response to the aging characteristics.

2. The rejuvenation processing device according to claim 1,
   wherein the aging management unit detects and records the aging state in real time for each of the plurality of host machines, and
   wherein the rejuvenation scheduling unit selects the host machine which is rejuvenated in response to the recorded aging state.

3. The rejuvenation processing device according to claim 1, wherein the virtual machine migration unit stops the virtual machine to be migrated from the host machine selected as the object to be rejuvenated when the virtual machine is rejuvenated together with the host machine, and
   the server migration unit restarts and rejuvenates the migrated virtual machine.

4. The rejuvenation processing device according to claim 1, wherein the standby server is composed of a cold standby server which does not operate at the time of the standby, and
   the rejuvenation scheduling unit starts the standby server before the virtual machine is migrated, and stops the standby server which is rejuvenated and is standing by.

5. A rejuvenation processing system comprising:
   a plurality of host machines in which a virtual machine operates;
   at least one standby server in which the virtual machine does not operate;
   a processor;
   an acquisition unit, executed by the processor, that acquires a rejuvenation schedule of the host machines, a rejuvenation schedule of the virtual machine, and a migration schedule of the virtual machine;
   a rejuvenation scheduling unit, executed by the processor, that selects at least one of the host machines as an object to be rejuvenated from among each of the host machines on the basis of the rejuvenation schedule of the host machines;
   a virtual machine migration unit, executed by the processor, that migrates the virtual machine, operating in the host machine selected as the object to be rejuvenated, to the standby server on the basis of the migration schedule of the host machines and the rejuvenation schedule of the virtual machine;
   a server migration unit, executed by the processor, that operates the migrated virtual machine in the standby server and causes the standby server to function as the host machine;
   a host rejuvenation unit, executed by the processor, that rejuvenates the host machine selected as the object to be rejuvenated;
   a standby preparation unit, executed by the processor, that causes the rejuvenated host machine to stand by as the standby server; and
   an aging management unit, executed by the processor, in which aging characteristics are registered beforehand for each of the plurality of host machines,
   wherein the virtual machine migration unit migrates the virtual machine to the standby server after stopping the virtual machine when there is an overlap in schedule between the migration of the virtual machine operating in the host machine selected as the object to be rejuvenated and the rejuvenation processing of the virtual machine,
   wherein the virtual machine migration unit migrates the virtual machine to the standby server without stopping the virtual machine when there is no overlap in schedule between the migration of the virtual machine operating in the host machine selected as the object to be rejuvenated and the rejuvenation processing of the virtual machine,
   wherein the rejuvenation scheduling unit selects the host machine which is rejuvenated by individually determining each of the aging states, and
   wherein the rejuvenation scheduling unit selects the host machine which is rejuvenated in response to the aging characteristics.

6. A non-transitory information storage medium storing a computer program of a rejuvenation processing device that controls a plurality of host machines in which a virtual machine operates and at least one standby server in which the virtual machine does not operate, the program causing the rejuvenation processing device to execute:

an acquisition process of acquiring a rejuvenation schedule of the host machines, a rejuvenation schedule of the virtual machine, and a migration schedule of the virtual machine;

a rejuvenation scheduling process of selecting at least one of the host machines as an object to be rejuvenated from among each of the host machines on the basis of the rejuvenation schedule of the host machines;

a virtual machine migration process of migrating the virtual machine, operating in the host machine selected as the object to be rejuvenated, to the standby server on the basis of the migration schedule of the host machines and the rejuvenation schedule of the virtual machine;

a server migration process of operating the migrated virtual machine in the standby server and causing the standby server to function as the host machine;

a host rejuvenation process of rejuvenating the host machine selected as the object to be rejuvenated;

a standby preparation process of causing the rejuvenated host machine to stand by as the standby server; and an aging management process of registering aging characteristics beforehand for each of the plurality of host machines, wherein the virtual machine migration process migrates the virtual machine to the standby server after stopping the virtual machine when there is an overlap in schedule between the migration of the virtual machine operating in the host machine selected as the object to be rejuvenated and the rejuvenation processing of the virtual machine, wherein the virtual machine migration process migrates the virtual machine to the standby server without stopping the virtual machine when there is no overlap in schedule between the migration of the virtual machine operating in the host machine selected as the object to be rejuvenated and the rejuvenation processing of the virtual machine, wherein the rejuvenation scheduling process selects the host machine which is rejuvenated by individually determining each of the aging states, and wherein the rejuvenation scheduling process selects the host machine which is rejuvenated in response to the aging characteristics.

7. A data processing method of a rejuvenation processing device that controls a plurality of host machines in which a virtual machine operates and at least one standby server in which the virtual machine does not operate, comprising:

an acquisition operation of acquiring a rejuvenation schedule of the host machines, a rejuvenation schedule of the virtual machine, and a migration schedule of the virtual machine;

a rejuvenation scheduling operation of selecting at least one of the host machines as an object to be rejuvenated from among each of the host machines on the basis of the rejuvenation schedule of the host machines;

a virtual machine migration operation of migrating the virtual machine, operating in the host machine selected as the object to be rejuvenated, to the standby server on the basis of the migration schedule of the host machines and the rejuvenation schedule of the virtual machine;

a server migration operation of operating the migrated virtual machine in the standby server and causing the standby server to function as the host machine;

a host rejuvenation operation of rejuvenating the host machine selected as the object to be rejuvenated;

a standby preparation operation of causing the rejuvenated host machine to stand by as the standby server, an aging management operation of registering aging characteristics beforehand for each of the plurality of host machines, wherein the virtual machine migration operation migrates the virtual machine to the standby server after stopping the virtual machine when there is an overlap in schedule between the migration of the virtual machine operating in the host machine selected as the object to be rejuvenated and the rejuvenation processing of the virtual machine, wherein the virtual machine migration operation migrates the virtual machine to the standby server without stopping the virtual machine when there is no overlap in schedule between the migration of the virtual machine operating in the host machine selected as the object to be rejuvenated and the rejuvenation processing of the virtual machine, wherein the rejuvenation scheduling operation selects the host machine which is rejuvenated by individually determining each of the aging states, and wherein the rejuvenation scheduling operation selects the host machine which is rejuvenated in response to the aging characteristics.

8. A rejuvenation processing device that controls a plurality of host machines in which a virtual machine operates and at least one standby server in which the virtual machine does not operate, comprising:

a processor;

an acquisition unit, executed by the processor, that acquires a rejuvenation schedule of the host machines, a rejuvenation schedule of the virtual machine, and a migration schedule of the virtual machine;

a rejuvenation scheduling unit, executed by the processor, that selects at least one of the host machines as an object to be rejuvenated from among each of the host machines on the basis of the rejuvenation schedule of the host machines;

a virtual machine migration unit, executed by the processor, that migrates the virtual machine, operating in the host machine selected as the object to be rejuvenated, to the standby server on the basis of the migration schedule of the host machines and the rejuvenation schedule of the virtual machine;

a server migration unit, executed by the processor, that operates the migrated virtual machine in the standby server and causes the standby server to function as the host machine;

a host rejuvenation unit, executed by the processor, that rejuvenates the host machine selected as the object to be rejuvenated;

a standby preparation unit, executed by the processor, that causes the rejuvenated host machine to stand by as the standby server; and an aging management unit, executed by the processor, that detects and records the aging state in real time for each of the plurality of host machines, wherein the virtual machine migration unit migrates the virtual machine to the standby server after stopping the virtual machine when there is an overlap in schedule between the migration of the virtual machine operating in the host machine selected as the object to be rejuvenated and the rejuvenation processing of the virtual machine, wherein the virtual machine migration unit migrates the virtual machine to the standby server without stopping the virtual machine when there is no overlap in schedule between the migration of the virtual machine operating in the host machine selected as the object to be rejuvenated and the rejuvenation processing of the virtual machine, wherein the rejuvenation scheduling unit selects the host machine which is rejuvenated by individually determining each of the aging states, and wherein the rejuvenation scheduling unit selects the host machine which is rejuvenated in response to the recorded aging state.

9. A rejuvenation processing system comprising:

a plurality of host machines in which a virtual machine operates;

at least one standby server in which the virtual machine does not operate;

a processor;

an acquisition unit, executed by the processor, that acquires a rejuvenation schedule of the host machines, a rejuvenation schedule of the virtual machine, and a migration schedule of the virtual machine;

a rejuvenation scheduling unit, executed by the processor, that selects at least one of the host machines as an object to be rejuvenated from among each of the host machines on the basis of the rejuvenation schedule of the host machines;

a virtual machine migration unit, executed by the processor, that migrates the virtual machine, operating in the host machine selected as the object to be rejuvenated, to the standby server on the basis of the migration schedule of the host machines and the rejuvenation schedule of the virtual machine;

a server migration unit, executed by the processor, that operates the migrated virtual machine in the standby server and causes the standby server to function as the host machine;

a host rejuvenation unit, executed by the processor, that rejuvenates the host machine selected as the object to be rejuvenated;

a standby preparation unit, executed by the processor, that causes the rejuvenated host machine to stand by as the standby server; and an aging management unit, executed by the processor, that detects and records the aging state in real time for each of the plurality of host machines, wherein the virtual machine migration unit migrates the virtual machine to the standby server after stopping the virtual machine when there is an overlap in schedule between the migration of the virtual machine operating in the host machine selected as the object to be rejuvenated and the rejuvenation processing of the virtual machine, wherein the virtual machine migration unit migrates the virtual machine to the standby server without stopping the virtual machine when there is no overlap in schedule between the migration of the virtual machine operating in the host machine selected as the object to be rejuvenated and the rejuvenation processing of the virtual machine, wherein the rejuvenation scheduling unit selects the host machine which is rejuvenated by individually determining each of the aging states, and wherein the rejuvenation scheduling unit selects the host machine which is rejuvenated in response to the recorded aging state.

* * * * *